Patented Feb. 16, 1937

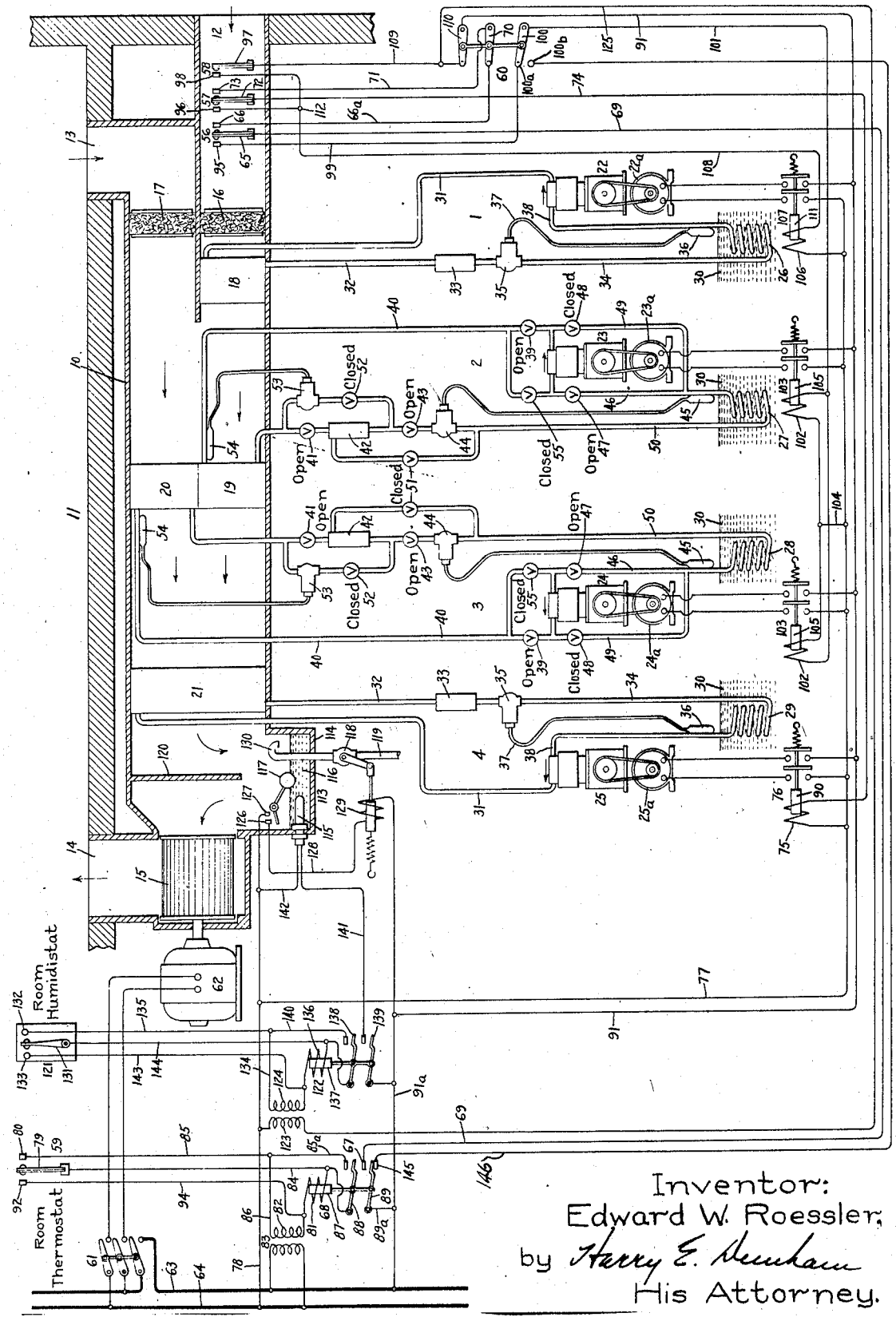

2,071,178

UNITED STATES PATENT OFFICE 2,071,178

AIR CONDITIONING SYSTEM

Edward W. Roessler, Schenectady, N. Y., assignor to General Electric Company, a corporation of New York Application June 18, 1935, Serial No. 27,158

6 Claims. (Cl. 257—3)

My invention relates to systems for conditioning the air within rooms or enclosures.

The load imposed on air conditioning systems varies widely with changes in the temperature of the air admitted to the system for conditioning. For example, in the winter when a room or other enclosure is being heated by such a system, the amount of heat required on relatively warm days will be much less than that required on cold days. If a heating system is made to operate at its highest efficency on a cold day, there will be a loss in efficiency on warmer days. It has been proposed to overcome this disadvantage by providing a plurality of units for heating or for cooling the air and by operating only the number of units required for a given temperature of the air admitted to the conditioner, each unit being operated under substantially full load conditions. The efficiency of air conditioning systems utilizing refrigerating machines for both heating and cooling may be increased greatly by such an arrangement.

It is an object of my invention to provide an air conditioning system employing a heat exchange surface, the effective area of which is varied dependent upon the temperature of air admitted to the system and the operation of which is controlled in response to the temperature of the air within the enclosure to be conditioned.

Another object of my invention is to provide an improved air conditioning system utilizing a plurality of heat exchanging elements or units and so arranged that the number of elements which may be operated is automatically varied with the changes in temperature of the air admitted to the system.

Another object of my invention is to provide an air conditioning system having a plurality of heat exchange elements or units and so arranged that the number of units in operation is determined by the temperature of the air admitted to the system while the operation of the units is controlled by the temperature of the air within the enclosure to be conditioned.

A further object of my invention is to provide an improved air conditioning system of the type utilizing refrigerating machines as heat pumps both for heating and for cooling the air to be conditioned.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing, the single figure of which shows diagrammatically an air conditioning system and control therefor embodying my invention.

Referring now to the drawing, I have shown an air conditioning system including a duct 10 through which air is circulated and conditioned and then discharged into an enclosure 11. Outdoor or fresh air is admitted to the duct through an intake passage 12 and room air for recirculation enters the duct through a passage 13. The fresh air and room air are mixed and circulated through the duct where the mixture is conditioned and then forced into the room or enclosure 11 through an outlet passage 14 by operation of a fan or blower 15. The outdoor or fresh air admitted to the duct is cleaned by a filter 16 in the passage 12 and the room or recirculated air is cleaned by a filter 17 in the passage 13.

A plurality of heat exchange elements 18, 19, 20, and 21 are provided for varying the temperature of the air circulated through the duct 10. For purposes of illustration, the heat exchange elements 18, 19, 20, and 21 have been shown as condensers or radiators of refrigerating machines 1, 2, 3, and 4 respectively, including compressors 22, 23, 24, and 25 respectively, and evaporators 26, 27, 28, and 29 respectively. Compressors 22, 23, 24, and 25 are connected to be driven by motors 22a, 23a, 24a, and 25a, respectively. The evaporators 26, 27, 28, and 29 are arranged to absorb heat from a heat source such as a body of water 30 contained within a tank or other vessel and supplied from some suitable source such as a deep well of substantially constant temperature and which can supply a sufficient volume of water for the maximum heating requirements of the system. Refrigerating machines are particularly suitable for systems of this type since they may be utilized either to heat or to cool the heat exchanging elements associated with them, it being possible to construct a refrigerating machine with a reversible refrigerant circuit so that either one of the heat exchanging elements thereof may be the evaporator or the condenser, as desired.

In the system shown, the refrigerant circuits of machines 2 and 3 can be reversed to cool the air in the duct 10 by pumping heat from the air in the duct to the source of heat 30, condensers 19 and 20 operating as evaporators and evaporators 27 and 28 operating as condensers.

Machines 2 and 3 are therefore available either to heat or to cool the air to be conditioned. Machines 1 and 4 are not reversible and are utilized only when it is desired to heat by pumping heat from the source 30 to the air in the duct 10.

The refrigerant circuits of machines 1 and 4 are similar and with the exception of the compressors, condensers and evaporators, the corresponding parts of the refrigerant circuits of these two machines have been designated by the same numerals. During the operation of machines 1 and 4, the compressors 22 and 25 deliver compressed gaseous refrigerant through conduits 31 to condensers 18 and 21. The gaseous refrigerant is liquefied in condensers 18 and 21 by dissipation of heat to the air in duct 10 and the liquid refrigerant flows through conduits 32 to liquid receivers 33. The liquid refrigerant is then admitted to evaporators 26 and 29 through conduits 34 by operation of thermostatic expansion valves 35. The valves 35 are operated to maintain a predetermined temperature on the suction side of the evaporators, thermostatic bulbs 36 containing a volatile liquid being secured on the suction side of the evaporators to operate the valves 35 through tubes 37. The liquid refrigerant admitted to evaporators 26 and 29 is vaporized by the absorption of heat from the source 30 and is withdrawn from the evaporators and returned to compressors 22 and 25 through conduits 38.

The refrigerant circuits of reversible machines 2 and 3 are also similar and with the exception of the compressors, condensers, and evaporators, corresponding parts of the refrigerant circuits of these machines have been designated by the same numerals. Several manually operated valves employed for reversing the machines have been marked with the letter "v" and are indicated as open or closed, these valves being shown in their positions when machines 2 and 3 are pumping heat from the source 30 to condensers 19 and 20.

During the normal or heating operation of machines 2 and 3, with the manual valves in the positions shown, compressors 23 and 24 deliver gaseous refrigerant through valves 39 and conduits 40 to condensers 19 and 20. The gaseous refrigerant is cooled by dissipating heat to the air circulating through condensers 19 and 20 and is liquefied, the liquid refrigerant flowing through valve 41 into liquid receivers 42. From the receivers 42 the liquid flows through valves 43 and thermostatic expansion valves 44 to evaporators 27 and 28, the expansion valves 44 being operated by thermostatic bulbs 45 secured to the suction sides of the evaporators. Gaseous refrigerant is withdrawn from the evaporators through conduits 46 and valves 47 and is returned to the compressors.

During the reversed or cooling operation of machines 2 and 3 the manually operated valves marked "closed" are opened and those marked "open" are closed. Compressors 23 and 24 then operate to deliver gaseous refrigerant through valves 48 and conduits 49 to evaporators 27 and 28 which act as condensers, cooling and liquefying the refrigerant. The liquid refrigerant then passes through conduits 50 and valves 51 to receivers 42 from which it passes through valves 52 and thermostatic expansion valves 53 to condensers 19 and 20, which now operate as evaporators. The temperature of the heat exchange devices 19 and 20 is now controlled by expansion valves 53 provided with thermostatic bulbs 54 on the suction sides of these evaporators. The liquid refrigerant absorbs heat from and cools the air in duct 10 and is thereby vaporized, the vaporized refrigerant being withdrawn and returned to the compressors 23 and 24 through conduits 40 and valves 55.

For any given air conditioning system the desirable number and arrangement of the heat exchange elements will be determined upon consideration of the particular requirements of the system and the size and type of machines obtainable. In the system described, the condenser 18 is used as a pre-heater in the fresh air passage, the heat exchange devices 19 and 20 are arranged as a unit, each device affecting one-half of the air passing through the duct 10, and condenser 21 is arranged entirely across the duct.

In accordance with my invention, the number and order of the heat exchange elements which may be operated to change the temperature of the air passing through the duct are automatically selected in response to the temperature of the fresh air admitted to the duct 12, and the operation of one or more of the elements selected is controlled in response to the temperature of the air within the enclosure to be conditioned. The change of the number of heat exchange elements clearly changes the effective surface area available for varying the temperature of the circulated air. The system may be operated either to heat or to cool the air in the air circulating duct as required, and a humidifier is provided to add moisture to the air when required, but only when the system is set to heat the air in the enclosure.

Referring again to the drawing, three thermostats 56, 57, and 58 are arranged in the fresh air passage 12 and are responsive to the temperature of the fresh air admitted to the duct 10. These three thermostats are connected to select which of the condensers 18, 19, 20, and 21 may be operated and in what order, when it is desired to heat the air supplied to the enclosure 11. A thermostat 59 responsive to the temperature of the air in the enclosure 11 is arranged to control the operation of one or more of the refrigerating machines 2, 3, and 4, depending upon the selection made by thermostats 56, 57, and 58. A three-pole transfer switch 60 is provided to change the electrical control circuits from heating position to cooling position, it being shown in its position for heating control. During the cooling operation of the system, machines 2 and 3 operate as a unit and in the arrangement illustrated, no selection is made with changes in outdoor temperatures; thermostats 56, 57, and 58 are therefore not effective during cooling and the reversed machines 2 and 3 are controlled directly by room thermostat 59.

For purposes of illustration, specific temperature settings of the thermostats are hereinafter assumed. During the heating of the air in duct 10 when the temperature of the outside air is above 45° F., machine 4 is available for heating and to be operated in response to the room thermostat 59. When the temperature of the outside air is below 45° F., but above 25° F., machine 1 runs continuously to heat the fresh air in the duct 12, and machines 2 and 3 are available for heating the heat exchange devices 19 and 20 and for operation in response to the room thermostat 59. When the temperature of the outside air is below 25° F., machines 1 and 4 run continuously to produce heating of the air, and machines 2 and 3 are available for heating and operate in response to the thermostat 59.

The operation of the control circuits during heating will now be described assuming the temperature of the outside air to vary gradually from above 45° F., to below 25° F.

In order to energize the control and power circuits, a three-pole switch 61 is closed. This energizes a motor 62 for driving fan 15, and also energizes one side 63 of the power and control bus, the other side 64 of the bus being connected directly to the source of power. It is evident that none of the control or power circuits can be energized unless the fan 15 is operating to circulate air through duct 10. In order that the control circuits shall be available to control the operation of machines 1, 2, 3, and 4, during heating switch 60 must be in the upper closed position shown on the drawing. When the temperature of the outside air entering the passage 12 is above 45° F., a bi-metallic strip 65 of the thermostat 56 engages a contact 66 thereof. This closes a circuit from a contact 67 on a relay 68 of the room thermostat 59 to contact 73 of thermostat 57 through lead 69, thermostat 56, lead 66a, pole 70 of switch 60 and a lead 71. Bi-metallic strip 72 of thermostat 57 engages contact 73 thereof and continues the foregoing circuit through lead 74, solenoid 75 of a motor operating relay 76 and leads 77 and 78 to the bus 64. If, now, thermostat 59 calls for heat, bi-metallic strip 79 thereof engages contact 80 and closes the circuit of an operating coil 81 of relay 68, the coil circuit including secondary 82 of transformer 83, coil 81, lead 84, strip 79, contact 80, lead 85, and connection 86. Coil 81 is thereby energized and raises an armature 87 to shift upper and lower arms 88 and 89 respectively of relay 68. The upper arm 88 closes a holding circuit for coil 81 from the secondary 82 through connection 86, a connection 85a, and arm 88. The lower arm 89 closes the circuit through solenoid 75 described above by connecting contact 67 with bus 63 through a connection 89a. Energization of solenoid 75 moves an armature 90 of relay 76 to the left and closes the circuit of motor 25a, connecting the motor to bus 64, through leads 77 and 78 and to bus 63 through leads 91 and 91a. Machine 4 is thereby set in operation to heat air passing through duct 10. When sufficient heat has been added to the air within the room 11, strip 79 of thermostat 59 will engage a contact 92 thereof which provides a short circuit or shunt around coil 81 through leads 84 and 94 deenergizing coil 81. Armature 87 then drops out, breaking connection between contact 67 and arm 89 to bus 63 and deenergizing relay solenoids 75, thereby opening the circuit of motor 25a and stopping operation of machine 4. Thermostat 59 will continue to control machine 4 as long as the temperature of the air entering the passage 12 is above 45° F.

When the temperature of the air entering the passage 12 falls below 45° F., but above 25° F., bi-metallic strip 65 of relay 56 will engage a contact 95 thereof, bi-metallic strip 72 of thermostat 57 will assume a position between contact 73 and a second contact 96 thereof, but engaging neither contact, and a bi-metallic strip 97 of relay 58 will engage a contact 98 thereof. When the thermostats 56, 57, and 58 are in this position, a circuit is closed from contact 67 of relay 68 to bus 64 through lead 69, bi-metallic strip 65, contact 95, a lead 99, a contact 100a and a pole 100 of switch 60, a lead 101, then in parallel through solenoids 102 of relays 103 for operating motors 23a and 24a of machines 2 and 3 respectively, thence to lead 78 through a connection 104 and lead 77. When thermostat 59 calls for heat in the manner described above, contact 67 is connected to bus 63 through blade 89 and energizing the circuit just described, thereby energizing solenoids 102, actuating armature 105 of relays 103, thereby connecting motors 23a and 24a to leads 77 and 91 and starting the motors. When sufficient heat has been added to the enclosure 11, and strip 79 of thermostat 59 moves to engage contact 92, the connection between contact 67 and bus 63 is broken and motors 23a and 24a are deenergized. Machines 2 and 3 are thus available for heating and are under the control of room thermostat 59. A second control circuit is established from lead 78 through lead 77 and a solenoid 106 of a relay 107 of motor 22a to a lead 108, thence to contact 98, strip 97, a lead 109, and to lead 91 through a pole 110 of switch 60. Since leads 77 and 91 are energized by direct connection with buses 64 and 63 respectively, solenoid 106 is energized, operating an armature 111 of relay 107 and closing the circuit of motor 22a, thereby operating machine 1 continuously as long as strip 97 of thermostat 58 is maintained in engagement with contact 98.

If the temperature of the air entering the passage 12 now decreases until it is below 25° F., bi-metallic strip 72 of thermostat 57 will engage contact 96 thereof. This will establish a circuit energizing the solenoid 75 in parallel with solenoid 106. This circuit may be traced from lead 77 through solenoid 75, lead 74 and strip 72 all in parallel with solenoid 106 and lead 108, the parallel circuits being joined at a point 112, and thence back to lead 91 through contact 98, strip 97 and pole 110, thereby completing the circuit. Solenoid 75 is then energized to close relay 76 and to start motor 25a; and, since solenoid 106 remains energized, machines 1 and 4 run continuously. The control circuits of machines 2 and 3 are not changed by further decrease of temperature below 25° F., and these machines are still available for operation in response to room thermostat 59.

If now the temperature of the outside air increases, the operations just described will occur in the reverse order. When the temperature rises above 25° F., continuous operation of machine 4 will be suspended, machine 1 will be run continuously, and machines 2 and 3 will be under control of the room thermostat. When the temperature rises above 45° F., the operation of machines 1, 2, and 3 will be suspended and machine 4 will be placed in operation under control of the room thermostat.

A humidifier 113 is provided to add moisture to the air passing through the duct 10 during the heating operation. This humidifier comprises a tank 114 arranged at the discharge end of duct 10 and a heater 115 for vaporizing water 116 contained in the tank. A float 117 arranged to operate electrically a valve 118 in a water supply conduit 119 is provided to maintain a substantially constant level of water in the tank 114. Air drawn by the fan 15 through the duct 10 is caused to pass over the surface of the water 116, a baffle 120 being provided, if desired, to direct the air downwardly against the surface of the water. The control for the humidifier 113 comprises a room humidistat 121 operating a relay 122 which in turn energizes the heater 115. Relay 122 is energized by a transformer comprising a primary winding 123 and a secondary winding 124. The primary winding is connected in a circuit which may be traced from the bus 64 through lead 78, primary 123, lead 125, pole 110 of switch 60, lead 91, back to bus 63, through lead 91a. When switch 60 is moved to its lower position, pole 110 is opened, and thereby opens the circuit of the primary 123. The room humidistat can therefore operate to control the humidifier only when the system is set for heating, and the switch 60 is in its upper closed position shown in the drawing. The humidifier is inoperative at all other times. Float 117 is arranged to connect contacts 126 and 127 whenever the water 116 falls below a predetermined level. This completes a circuit from bus 64, lead 78, contacts 127 and 126, a connection 128, a valve operating solenoid 129 and back to bus 63 through lead 91a. The solenoid 129 is arranged to operate valve 118 to supply water to the tank 114 through an inlet pipe 130. Humidistat 121 is provided with a contact making member 131 which engages a contact 132 to operate the humidifier 113 when the relative humidity in the enclosure is below the desired value, and a contact 133 to stop operation of the humidifier 113. When the pole 110 of switch 60 is closed, as shown, if member 131 of the humidistat engages contact 132, a circuit is established from the secondary 124 through lead 134, lead 135, member 131, a lead 144 and a solenoid 136, and back to the secondary 124. Energization of solenoid 136 raises armature 137 and closes arms 138 and 139. Arm 138 when closed establishes a holding circuit for solenoid 136 through transformer 124, connection 134 and connection 140, to arm 138 and solenoid 136. Arm 139 closes a circuit from lead 91a and a lead 141 to heater 115 and through a connection 142 to lead 78, thereby energizing the heater 115, heating the water 116 and supplying moisture to the air passing through duct 10. When the contact member 131 engages contact 133, the solenoid 136 is short-circuited through leads 143 and 144 and the armature 137 drops out, opening blade 139 and deenergizing the heater 115, thereby decreasing or stopping the supply of moisture to the air.

When it is desired to operate the air conditioning system to cool the air passing through duct 10, the manually operated valves of machines 2 and 3 are moved to their positions opposite those in which they are shown in the drawing to reverse the operation of machines 2 and 3 in the manner previously described. In order to prevent operation of machines 1 and 4 to heat the air passing through the duct 10 when machines 2 and 3 are reversed, switch 60 is moved to its lower position, opening poles 70 and 110 and moving the pole 100 from upper contact 100a to a lower contact 100b. This opens the control circuits of machines 1 and 4, and establishes a circuit from bus 63 through connection 89a, arm 89, contact 145 of room thermostat relay 68 through a lead 146, pole 100, lead 101, solenoids 102 in parallel, connection 104, and leads 77 and 78 to bus 64. In this manner solenoids 102 are energized, which operate armatures 105, thereby closing relays 103 and energizing motors 23a and 24a to drive machines 2 and 3. Machines 2 and 3 operate to pump heat out of the air flowing through duct 10, thereby cooling the air. Should the temperature of the air within the enclosure 11 be lowered below a predetermined desired value, strip 79 of thermostat 59 will engage the contact 80 and energize coil 81 of relay 68 to lift the armature 87 and disengage arm 89 from contact 145. This deenergizes solenoids 102 and opens the motor circuits. When the temperature of the air within the enclosure 11 has risen to a predetermined value, thermostat 59 will then call for cooling, strip 79 engaging contact 92 and shorting coil 81, thereby causing armature 87 to drop out and reestablish a circuit through solenoid 102, thereby starting machines 2 and 3 to again cool air circulating through duct 10.

From the foregoing it is evident that I have provided a system for conditioning the air within an enclosure and which may be employed at any season of the year, either to heat or to cool the enclosure. Furthermore I have provided an air conditioning system which may be operated at high efficiency regardless of changes in the temperature of the air admitted to the system. It is further evident that I have provided a simple and effective arrangement for determining the number and order of operation of a plurality of heat exchange units of an air conditioning system.

While I have disclosed a particular embodiment of my invention in connection with an air conditioning system utilizing refrigerating machines as heat pumps, various modifications will occur to those skilled in the art. I do not, therefore, desire my invention to be limited to the embodiment shown and described and I intend in the appended claims to cover all modifications thereof which do not depart from the spirit and scope of my invention.

What I claim as new and desire to secure by Letters Patent of the United States is:

1. A system for conditioning the air within an enclosure including a duct for admitting air to said enclosure, means for circulating air through said duct, means including a plurality of heat exchange elements arranged in said duct for varying the temperature of the air passing therethrough, means including a plurality of sources for supplying a heat exchanging medium to said elements, each of said elements being supplied by a separate one of said sources, means responsive to the temperature of the air entering said duct for selecting the number of said heat exchange elements and of said sources which may be operated, and means independent of said last-mentioned means and responsive to the temperature of the air within said enclosure for controlling the operation of at least one of said sources of supply selected by said last mentioned means.

2. A system for conditioning the air within an enclosure including a duct for admitting air to said enclosure, means for circulating air through said duct, a source of heat, means including a plurality of refrigerating machines arranged to pump heat from said source for heating the air circulating through said duct, each of said refrigerating machines having a condenser arranged in said duct and an evaporator arranged to receive heat from said source, means responsive to the temperature of the air admitted to said duct for selecting the number of said machines which may be operated, and means responsive to the temperature of the air within said enclosure for controlling the operation of at least one of the machines selected by said last mentioned means.

3. A system for conditioning the air within an enclosure including a duct for admitting air to said enclosure, means for circulating air through said duct, a source of heat, a plurality of refrigerating machines, each of said machines having a condenser and an evaporator, said condensers being arranged in said duct to heat the air circulating therethrough said evaporators being arranged to receive heat from said source, means for reversing at least one of said machines to cool the air circulating through said duct and for preventing operation of the others of said machines, and means responsive to the temperature in said enclosure for regulating said machines when heating and when cooling the air circulating through said duct.

4. A system for conditioning the air within an enclosure including a duct for admitting air to said enclosure, a plurality of heat dissipating elements arranged within said duct, a source of heat, a plurality of heat absorbing elements arranged to receive heat from said source, a plurality of heat pumping means for pumping heat from said heat absorbing elements to said heat dissipating elements, each of said heat pumping means being connected to pump heat from a separate one of said heat absorbing elements to a separate one of said heat dissipating elements, means responsive to the temperature of the air admitted to said duct for selecting the number of said plurality of heat pumping means which may be operated, and means responsive to the temperature of the air within said enclosure for controlling the operation of at least one of said heat pumping means selected by said last mentioned temperature responsive means.

5. A system for conditioning the air within an enclosure including a duct for admitting air to said enclosure, a plurality of heat dissipating elements arranged within said duct, a source of heat, a plurality of heat absorbing elements arranged to receive heat from said source, a plurality of heat pumping means for pumping heat from said heat absorbing elements to said heat dissipating elements, each of said heat pumping means being connected to pump heat from a separate one of said heat absorbing elements to a separate one of said heat dissipating elements, means responsive to the temperature of the air admitted to said duct for selecting the number of said plurality of heat pumping means which may be operated, means responsive to the temperature of the air within said enclosure for controlling the operation of at least one of said heat pumping means selected by said last mentioned temperature responsive means, means for reversing the operation of at least one of said heat pumping means to pump heat from the air within said duct to said source of heat and to cool the air within said duct and for preventing the operation of the remainder of said plurality of heat pumping means, and means responsive to the temperature of the air within said enclosure for controlling the operation of said heat pumping means.

6. A system for conditioning the air within an enclosure including a duct for admitting air to said enclosure, a plurality of heat dissipating elements arranged within said duct, a source of heat, a plurality of heat absorbing elements arranged to receive heat from said source, a plurality of heat pumping means for pumping heat from said heat absorbing elements to said heat dissipating elements, each of said heat pumping means being connected to pump heat from a separate one of said heat absorbing elements to a separate one of said heat dissipating elements, means responsive to the temperature of the air admitted to said duct for selecting the number of said plurality of heat pumping means which may be operated, means responsive to the temperature of the air within said enclosure for controlling the operation of at least one of said heat pumping means selected by said last mentioned temperature responsive means, means for reversing the operation of at least one of said heat pumping means to pump heat from the air within said duct to said source of heat and to cool the air within said duct, means for preventing the simultaneous operation of said reversed heat pumping means and the remainder of said plurality of heat pumping means, and means arranged within said duct for humidifying the air passing therethrough, said humidifying means being operative only when said heat pumping means are arranged to pump heat from said source to said heat dissipating elements.

EDWARD W. ROESSLER.